(12) United States Patent
Neyyan et al.

(10) Patent No.: US 9,646,009 B2
(45) Date of Patent: May 9, 2017

(54) METHOD AND APPARATUS FOR GENERATING A VISUAL REPRESENTATION OF OBJECT TIMELINES IN A MULTIMEDIA USER INTERFACE

(71) Applicant: Samsung Electronics Co., Ltd., Suwon-si, Gyeonggi-do (KR)

(72) Inventors: Biju Mathew Neyyan, Kerala (IN); Jaya Prakash Vanka, Andhrapradesh (IN); Praveen Krishnan, Bangalore (IN); Abhinandan Ganapati Banne, Bangalore (IN); Ranjith Tharayil, Kerala (IN)

(73) Assignee: Samsung Electronics Co., Ltd., Suwon-si (KR)

(*) Notice: Subject to any disclaimer, the term of this patent is extended or adjusted under 35 U.S.C. 154(b) by 56 days.

(21) Appl. No.: 14/711,265

(22) Filed: May 13, 2015

(65) Prior Publication Data

US 2015/0379011 A1 Dec. 31, 2015

(30) Foreign Application Priority Data

Jun. 27, 2014 (IN) .......................... 3134/CHE/2014
Jan. 21, 2015 (IN) .......................... 3134/CHE/2014

(51) Int. Cl.
*G06F 17/30* (2006.01)
*G06T 17/30* (2006.01)
*G06T 13/00* (2011.01)

(52) U.S. Cl.
CPC .. *G06F 17/30044* (2013.01); *G06F 17/30064* (2013.01); *G06T 13/00* (2013.01); *G06T 2200/24* (2013.01)

(58) Field of Classification Search
None
See application file for complete search history.

(56) References Cited

U.S. PATENT DOCUMENTS

| 6,091,427 A | 7/2000 | Boezeman et al. |
| 6,392,651 B1 | 5/2002 | Stradley |
| 2006/0274070 A1 | 12/2006 | Herman et al. |
| 2008/0178087 A1* | 7/2008 | Fitzgibbon .............. G06T 13/20 715/723 |
| 2010/0134499 A1* | 6/2010 | Wang ..................... G06T 13/80 345/473 |

(Continued)

*Primary Examiner* — Ryan M Gray
(74) *Attorney, Agent, or Firm* — Jefferson IP Law, LLP

(57) ABSTRACT

A method and an apparatus for generating a visual representation of object timelines in a multimedia user interface by illustrating time information, associated with a moving object that needs to be displayed, directly over a motion path of the moving object by assigning and displaying color-values on a time-line of the moving object and displaying corresponding colors on the motion-path are provided. The method includes presenting an object through a display operatively coupled with an electronic device, presenting a first visual indicator that relates time information associated with a motion of the object with a motion path of the object, and presenting a timeline associated with the time information. Here a visual property of the first visual indicator matches a visual property of the second visual indicator in relation with the time information.

20 Claims, 16 Drawing Sheets

(56) References Cited

U.S. PATENT DOCUMENTS

| | | | | |
|---|---|---|---|---|
| 2012/0320066 A1* | 12/2012 | James | ............ | G06T 13/00 |
| | | | | 345/473 |
| 2013/0097552 A1* | 4/2013 | Villaron | ............ | G06T 13/80 |
| | | | | 715/781 |
| 2013/0219344 A1* | 8/2013 | Zyracki | ............ | G06T 13/20 |
| | | | | 715/849 |
| 2015/0271645 A1* | 9/2015 | Wyatt | ............ | H04W 4/028 |
| | | | | 455/456.2 |

* cited by examiner

Time(sec) 001 002 003 004 005 006 007 008 009 010 011 012 013 014

Time(sec) 001 002 003 004 005 006 007 008 009 010 011 012 013 014

FIG.14

METHOD AND APPARATUS FOR GENERATING A VISUAL REPRESENTATION OF OBJECT TIMELINES IN A MULTIMEDIA USER INTERFACE

CROSS-REFERENCE TO RELATED APPLICATION(S)

This application claims the benefit under 35 U.S.C. §119 (a) of an Indian patent application filed on Jun. 27, 2014 in the Indian Patent Office and assigned Serial number 3134/CHE/2014, and of an Indian patent application filed on Jan. 21, 2015 in the Indian Patent Office and assigned Serial number 3134/CHE/2014, the entire disclosure of each of which is hereby incorporated by reference.

TECHNICAL FIELD

The present disclosure relates to user interfaces for multimedia data presentation. More particularly, the present disclosure relates to a method and a system for generating a visual representation of an object motion path and a timeline on a multimedia user interface.

BACKGROUND

Multimedia refers to the integration of text, images, audio and video in a variety of application environments. Media editing applications allow users to create composite multimedia applications (e.g., movies) based on several multimedia clips, such as audio and video clips that often display a visual representation which the user controls through certain actions, such as selecting buttons on a remote or moving a controller in a certain manner.

The visual representation is a computer representation that typically takes the form of a two-dimensional (2D) or three-dimensional (3D) model in various applications, such as computer games, video games, chats, forums, communities, instant messaging services, and the like. However, this data can be heavily time-dependent, such as video and audio in a motion picture, and can require time-ordered presentation during use. Oftentimes, the time-based information is assembled into a data presentation through the use of a processing system to edit the information. For example, a video may be edited and combined with audio, text, effects and/or graphics to create a visual representation. A visual representation is any changed version of an original time-based stream of information or a modified copy of the original information.

By the progress in technology, the processing power, resolution and the screen dimension of handheld devices have increased tremendously. A large number of users now make use of handheld devices to create content including animations rather than for just content-consumption. While creating animations, it is required to depict the motion of the objects in space-time. Usually this is accomplished by defining motion paths (i.e., to define a path in 2D or 3D space) and representing time using a timeline with a time segment, for each object in the animation. However, this consumes a lot of screen space as it requires a dedicated screen-space for providing timelines. In case of devices with smaller display area, such as a hand held tablet computer, screen space is very critical when it comes to image and animation related content creation. Further, the issue with the current user interfaces is that the compounded timelines complicate the editing process for the user. In addition, the display of multiple timelines wastes screen space that may be better served to display other useful editing tools.

In light of the shortcomings of the various currently available systems, there is a need for enabling a user to view the position, movement path, direction and time information in a single glance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for generating a visual representation of object timelines in a multimedia user interface.

In accordance with an aspect of the present disclosure, a method for generating a visual representation of object timelines in a multimedia user interface is provided. The method includes presenting an object through a display operatively coupled with an electronic device, presenting a first visual indicator that relates time information associated with a motion of the object with a motion path of the object, and presenting a timeline associated with the time information.

According to an embodiment of the present disclosure, the presenting of the first visual indicator includes receiving a selection of a time span on the timeline, wherein the first visual indicator corresponds to the time span and receiving includes presenting on the time span a second visual indicator corresponding to the first visual indicator.

According to an embodiment of the present disclosure, a visual property of the first visual indicator matches a visual property of the second visual indicator in relation with the time information.

According to an embodiment of the present disclosure, the presenting of the object includes presenting the object at a position on the motion path corresponding to the time information of a selected position on the timeline, moving the object along the motion path based on user input and moving another object, based on the moving of the first object, along a motion path of the another object, in an amount corresponding to time associated with the moving of the first object.

According to an embodiment of the present disclosure, the presenting of the object includes presenting the object at a specific position by user input and presenting the first visual indicator includes presenting the motion path of the object and the first visual indicator based on the specific position.

According to an embodiment of the present disclosure, the first visual indicator includes at least one of a color indicator, an alpha numeric indicator or a gray scale indicator. In addition, the first visual indicator includes representing the time information by using different colors in gradient or separate. Further, the motion path represents motion in a three-dimensional space. The first visual indicator is presented in relation with a multimedia object and with a tracking application with a map function.

In accordance with another aspect of the present disclosure, an apparatus for generating a visual representation of object timelines in a multimedia user interface is provided. The apparatus includes a processor, and a memory configured to store instructions when executed by the processor, wherein the processor is configured to present an object through a display operatively coupled with the apparatus, to present a first visual indicator that relates time information associated with a motion of the object with a motion path of the object, and to present a timeline associated with the time information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 14 illustrates a color representation with gradients vs color bands according to an embodiment of the present disclosure;

Throughout the drawings, it should be noted that like reference numbers are used to depict the same or similar elements, features, and structures.

DETAILED DESCRIPTION

Figure 1:
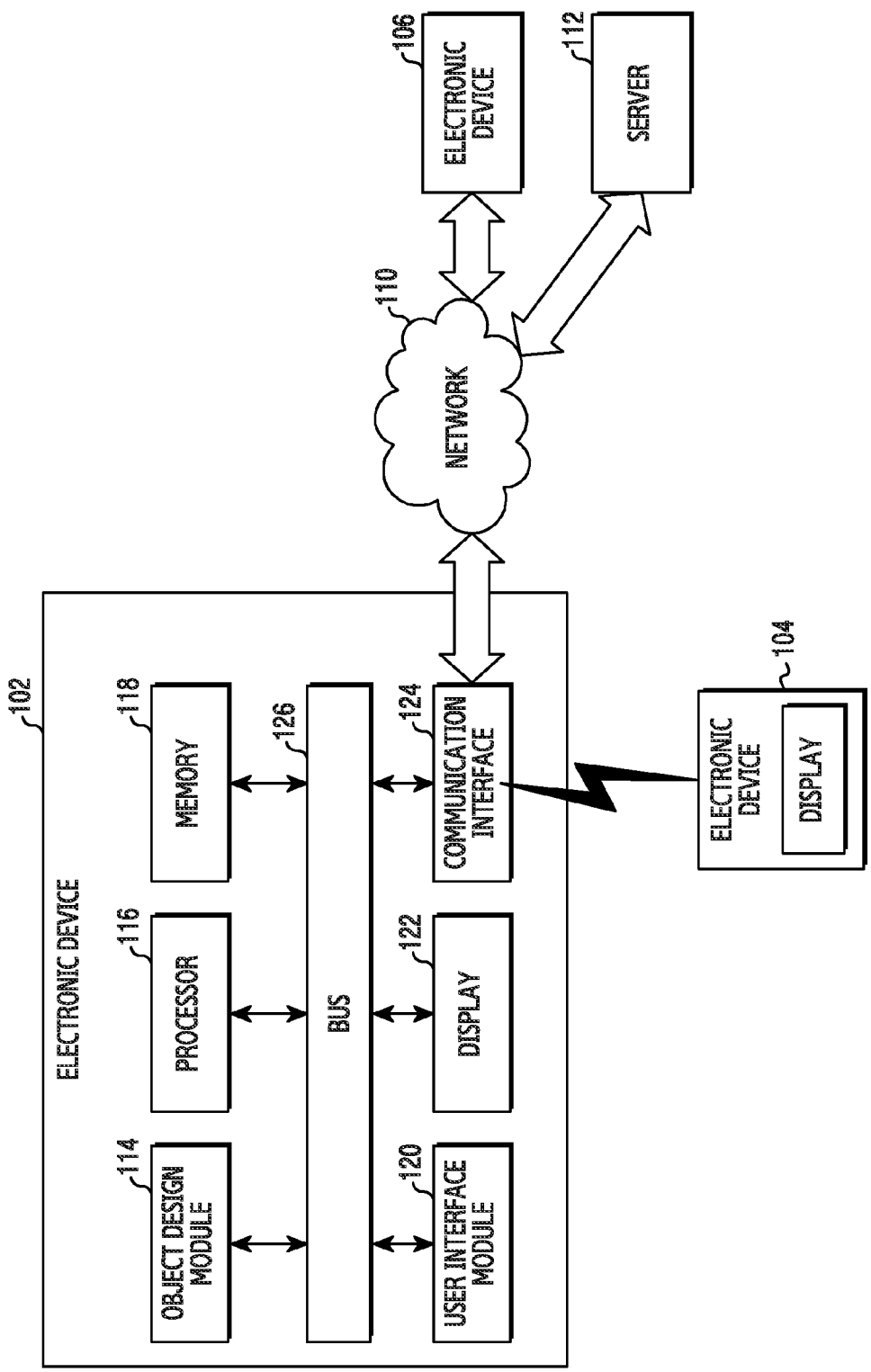
FIG. 1 is a block diagram illustrating a system for generating a visual representation of object timelines in a multimedia user interface of a user device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure provide a method and an apparatus for generating a visual representation of object timelines in a multimedia user interface. The method comprises tracking time information associated with a movement of an object of a multimedia presentation on the user interface and representing the time information of the object on the user interface using a visual indicator. Here the time information associated with the movement of the object is represented by assigning set values to the visual indicator along a motion path of the object and displaying the visual indicators corresponding to the assigned values on the object motion path. The visual indicator comprises one of a color indicator, an alpha numeric indicator or a gray scale indicator.

According to an embodiment of the present disclosure, the method for generating a visual representation of object timelines in a multimedia user interface further comprises translating the time information to a motion representation corresponding to the object movements and controlling the motion path of the objects based on at least one of a position, magnitude and direction of the movement of the object, object facing direction and time information. The motion path and timeline of the object is controlled using touch gestures.

The motion path of the objects are controlled by at least one of changing a time range marker, shifting a time range, changing a frame marker, editing time on the motion path, visual time synchronization and visual position synchronization. Further, time information associated with the object can be changed by varying visual indicator values associated with the visual indicators on the timeline and updating the modification in the timeline on the motion path in real time. The method of varying the visual indicator values comprises at least one of dragging a selected area on the motion path to shift timeline of the object, dragging at least one end of the timeline to increase or decrease the object movement speed, stretching the visual indicator range to regulate a speed of movement of the object, increasing or decreasing an intensity of the visual indicator to regulate the object movement at a particular location, moving an object position marker to shift objects position and moving the motion path to reposition and time synchronize the object based on the visual indicators. The color indicator is displayed as at least one of smooth gradient or as colored bands on the object motion path, interpolation of colors, and visual indicator of discrete values.

Here the object comprises of a media content including an animation, audio, video, graphics and text.

According to an embodiment of the present disclosure, the visual representation of the multimedia object can be created on multiple user interfaces, i.e., having timeline on display of a first device and the motion path on another display. Example, having timeline controls on a mobile phone and the editing interface on a tablet. The visual representation of multimedia object on multiple user interfaces comprises of tracking the time information associated with the movement of the object of the multimedia presentation on a user interface corresponding to a first device and representing the time information of the object on a user interface corresponding to a second device using the visual indicator.

Further, the time information associated with a moving object that needs to be displayed can be shown directly over a motion path of the moving object by assigning and displaying color-values on a time-line of the moving object and displaying corresponding colors on the motion-path. The color display is modified and the colors are displayed as a smooth gradient. Further, the colors are displayed as colored bands in which colors are assigned only to a selected portion of the timeline. Here, the selection is controlled using range markers. The selection of the range is modified by dragging the selected portion. When these selected portions are dragged, corresponding changes are updated on the motion path in real-time. The information displayed is enriched by adding other layers of information, such as depth in three-dimensional (3D) space, by using numbers/grey-scale values.

The time information of an object being animated is edited by manipulating corresponding color values directly on the motion-path. The colored area on the motion path is dragged to shift object's time information at the current position. Hence, dragging any end of the colored-line increases or decreases the speed of the animation. Further, the colors are pinched in/out to make the animation faster/slower at that particular location. The object position marker is moved to shift objects position at current time. The motion path is moved to reposition and time sync the animation referring colors. Further, the method of an embodiment of the present disclosure provides zooming into the editing area for more detail and precision.

FIG. 1 is a block diagram illustrating a system for generating a visual representation of object timelines in a multimedia user interface of a user device, according to an embodiment of the present disclosure.

Referring to FIG. 1, the system comprises of a plurality of electronic devices or user devices 102, 104, and 106 coupled over a network 110. Further, a central server 112 is also connected to the network 110. The electronic device 102 comprises of an object design module 114, a processor 116, a memory 118, a user interface module 120, a display 122 and a communication interface 124 which are all connected to a bus 126. The memory 118 configured to store the instructions executed by the processor 116, wherein the processor is configured to present an object through a display operatively coupled with the apparatus, to present a first visual indicator that relates time information associated with a motion of the object with a motion path of the object, and to present a timeline associated with the time information.

According to an embodiment of the present disclosure, the user interface module 120 or a part of elements or functions of the user interface module could be merged, split or included in another module (e.g., a memory, a display, and the like). Similarly the object design module or a part of the module can be placed any part of an element of the electronic device and any element of the module or any function of the module could be merged, split or placed in other module.

Figure 2:
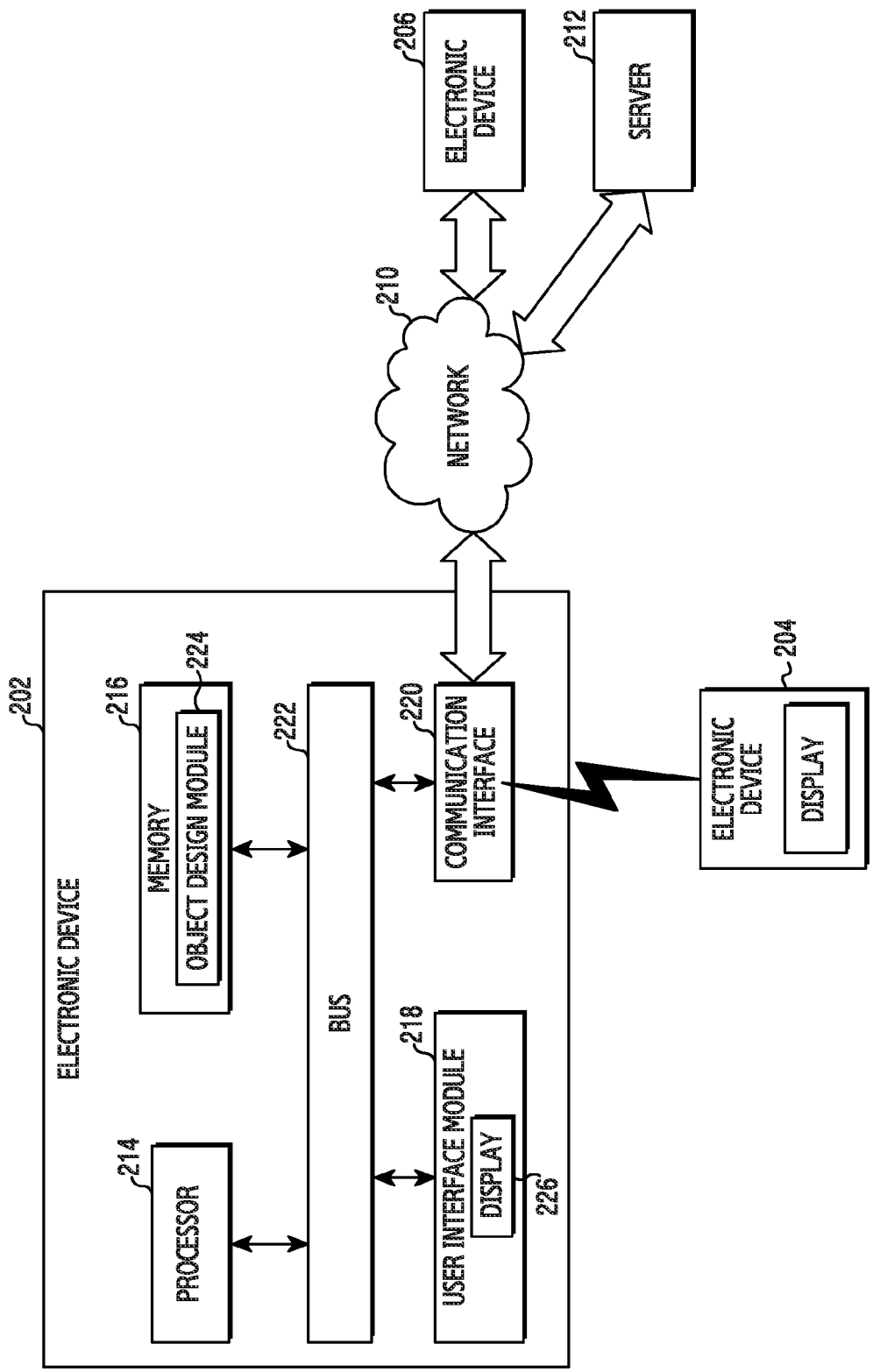
FIG. 2 is a block diagram illustrating a system for generating a visual representation of object timelines in a multimedia user interface of a user device according to another embodiment of the present disclosure.

FIG. 2 is a block diagram illustrating a system for generating a visual representation of object timelines in a multimedia user interface of a user device according to another embodiment of the present disclosure.

Referring to FIG. 2, electronic devices 202, 204, and 206 could also be coupled over a network 210. Further, the electronic device 202 is also connected to a server 212 over a network 210. The electronic device 202 comprises of a processor 214, a memory 216, a user interface module 218 and a communication interface 220 which are all connected to a bus 222. The memory 216 includes an object design module 224 and the user interface module 218 includes a display 226.

According to an embodiment of the present disclosure, the user interface module 120 or a part of elements or functions of the user interface module could be merged, split or included in another module (e.g., a memory, a display, and the like). Similarly the object design module or a part of the module can be placed any part of an element of the electronic device and any element of the module or any function of the module could be merged, split or placed in other module.

Further the display can be a part of the user interface module. Also the display does not necessarily need to be included in the electronic device (i.e., objects, UI could be presented on the display of the external device).

Figure 3:
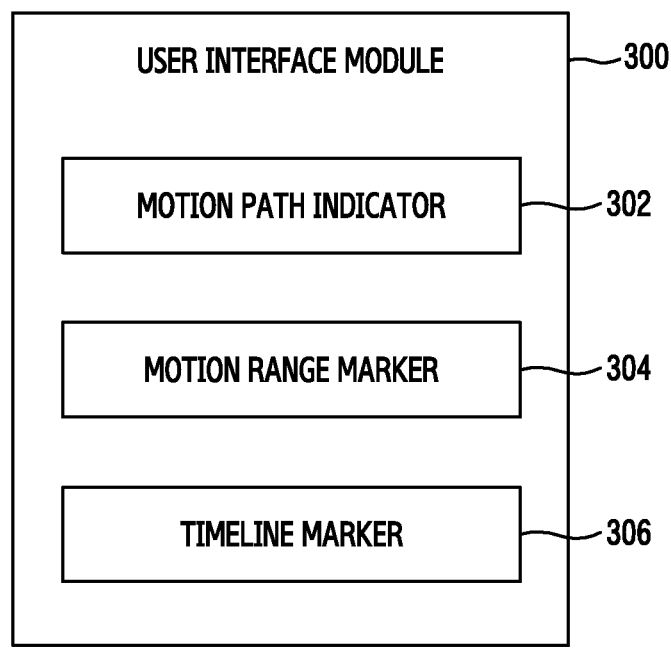
FIG. 3 is a block diagram of a user interface module according to an embodiment of the present disclosure.

FIG. 3 is a block diagram of a user interface module according to an embodiment of the present disclosure.

Referring to FIG. 3, a user interface module 300 includes a motion path indicator 302, a motion range marker 304 and a timeline marker 306. The motion path indicator 302 indicates if the motion path of the object is within a selected time range or not. The motion range marker 304 is adapted to control the selection of a portion of the timeline for which colors are to be assigned. Further, the selected portion for assigning the colors can be modified by dragging the selected portion using the motion range markers 304. The time line indicator 306 provides for selecting a time range by adjusting the "In Marker" and the "Out Marker". The selected time range is overlaid with a color spectrum (either continuous or as a sequence of color segments). The corresponding time segments on the motion path are represented with corresponding colors. Further, dragging any of the time range selection markers changes the length of the time range selected. The color spectrum size is readjusted to fill the newly selected range in real time. Corresponding changes are reflected on time representation on the motion path.

Figure 4:
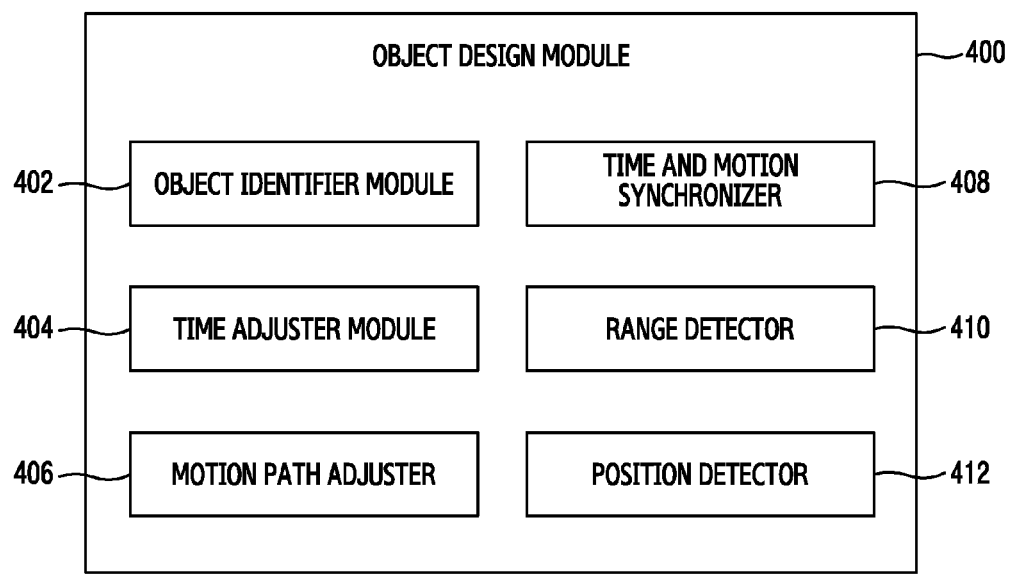
FIG. 4 is a block diagram of an object design module according to an embodiment of the present disclosure.

FIG. 4 is a block diagram of an object design module according to an embodiment of the present disclosure.

Referring to FIG. 4, an object design module 400 includes an object identifier module 402, a time adjuster module 404, a motion path adjuster 406, a time and motion synchronizer 408, a range detector 410, and a position detector 412. The object identifier module 402 is adapted to identify one or more objects in the motion path on the user interface. The time adjuster module 404 is adapted to adjust the selected time range by adjusting the position of the In marker and the Out marker. The motion path adjuster 406 is adapted to adjust the motion path in response to the change in time range. The time and motion synchronizer 408 is adapted to move the motion path to re-position and time synchronize the object by shifting the time directly on the motion path. The range detector 410 is adapted to regulate the movement of the object within the preset range. The position detector is adapted to determine the position of the object on the motion path and the corresponding time line.

Figure 5:
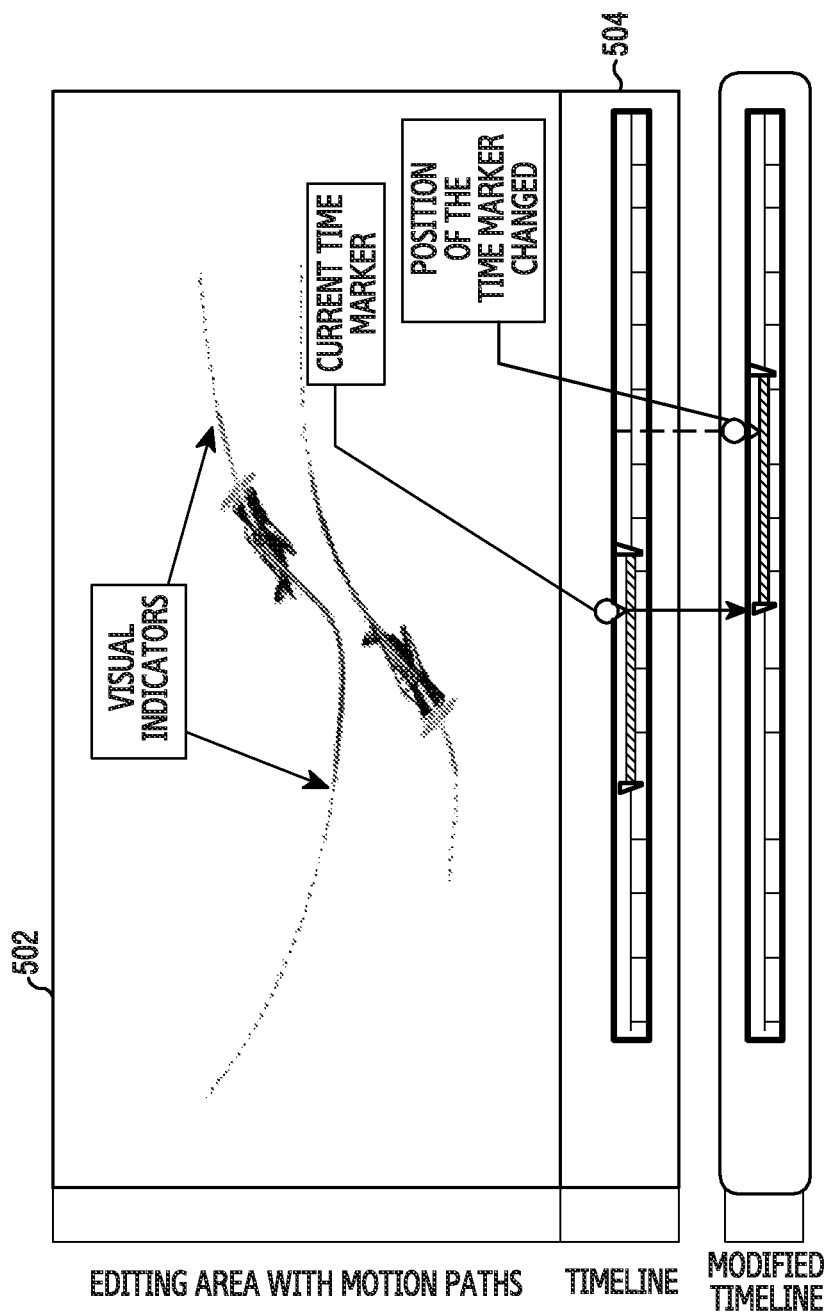
FIG. 5 is a snapshot of a multimedia user interface indicating various parameters involved in generating visual representation of the object timelines according to an embodiment of the present disclosure.

FIG. 5 is a snapshot of a multimedia user interface indicating various parameters involved in generating visual representation of the object timelines according to an embodiment of the present disclosure.

Referring to FIG. 5, an embodiment of the present disclosure enables displaying and editing the position, movement path, direction and time information at a single glance on the user interface of the electronic device associated with the user. The user interface comprises of an editing area 502 in which motion paths are displayed and a single timeline 504 for defining the time for the scene being edited. The object is displayed on the user interface of an electronic device, where a first visual indicator is presented which relates to time information associated with a motion of the object on a motion path of the object and the timeline is associated with the time information of the object.

Figure 6:
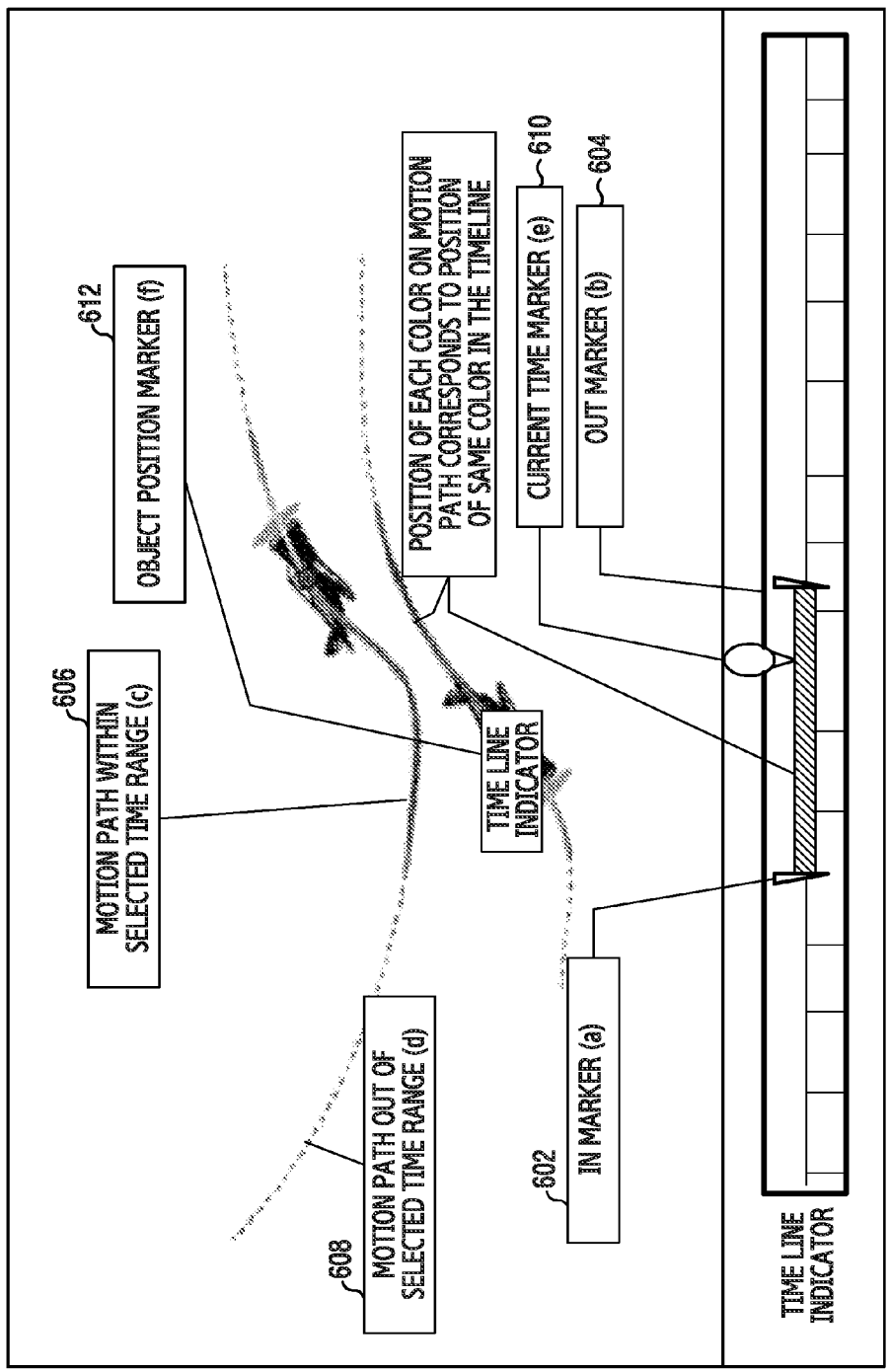
FIG. 6 is a schematic representation of a multimedia user interface indicating a time-range selection and representation of timeline on motion paths using colors according to an embodiment of the present disclosure.

FIG. 6 is a schematic representation of a multimedia user interface indicating a time-range selection and representation of timeline on motion paths using colors according to an embodiment of the present disclosure.

Referring to FIG. 6, a Current Time Marker 610 on the timeline is used to mark the position-in-time to be displayed on the editing area. The corresponding position in time is represented as Object Position Marker 612 which indicates the object position at current time on the motion path. Further, dragging the Current Time Marker 610 on the timeline results in movement of the object along the motion path and the new object position is indicated by the Object Position Marker 612.

The Time Range 606 is selected by adjusting the In-Marker 602 and the Out-Marker 604. The selected time range 606 is overlaid with a color spectrum (either as continuous color bands or as color gradients). The position of each color on the motion path corresponds to the position of same color in the timeline. Further, when the time range 606 is moved by dragging the colored area on the timeline to a different time range, the corresponding changes are reflected on the motion path. When any of the time range selection markers are dragged, either the In-Marker 602 or the Out-Marker 604, the length of the selected time range 606 changes accordingly. The color spectrum size is readjusted to fill the newly selected time range in real time. The corresponding changes are reflected on time representation on the motion path as well. The dotted line 608 on the motion path indicates the area out of selected time range on the motion path.

Figure 7:
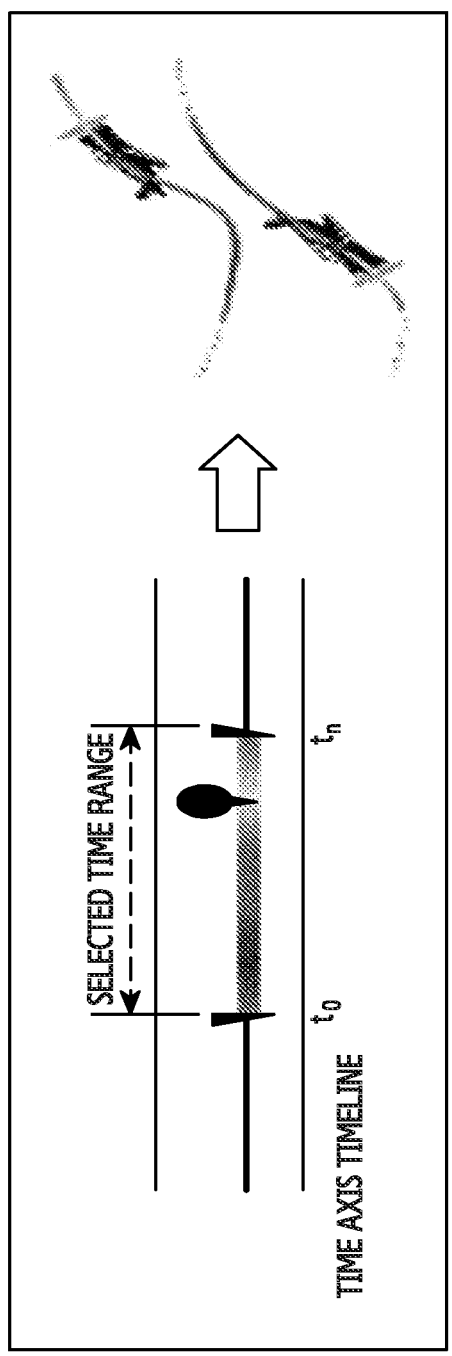
FIG. 7 illustrates a mapping of a time range selected on a timeline to a motion path of an object according to an embodiment of the present disclosure.

FIG. 7 illustrates a mapping of a time range selected on a timeline to a motion path of an object according to an embodiment of the present disclosure.

Referring to FIG. 7, the length of the time range is selected using the time range selection markers i.e., In Marker and the Out Marker. This provides the color spectrum size which is reflected on the motion path of the object.

Figure 8:
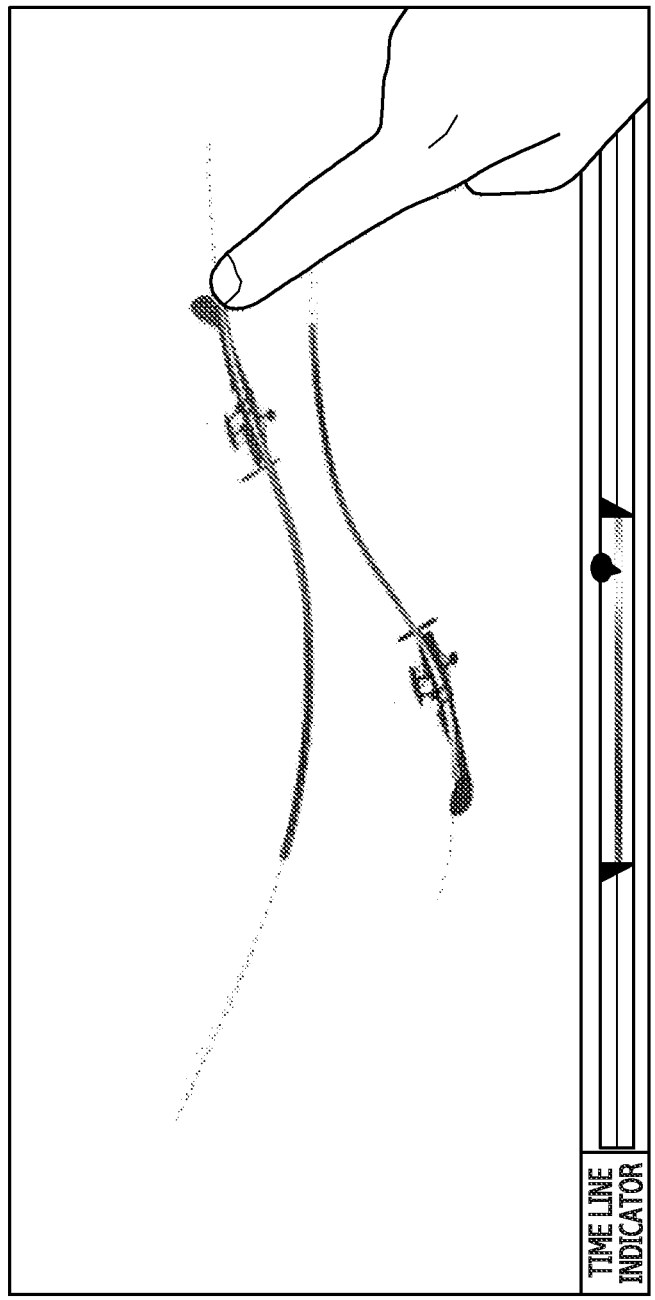
FIG. 8 illustrates a process of editing time by dragging an edge of a color spectrum on a motion path without changing an object's motion path according to an embodiment of the present disclosure.

FIG. 8 illustrates a process of editing time by dragging an edge of a color spectrum on a motion path without changing an object's motion path according to an embodiment of the present disclosure.

Figure 9:
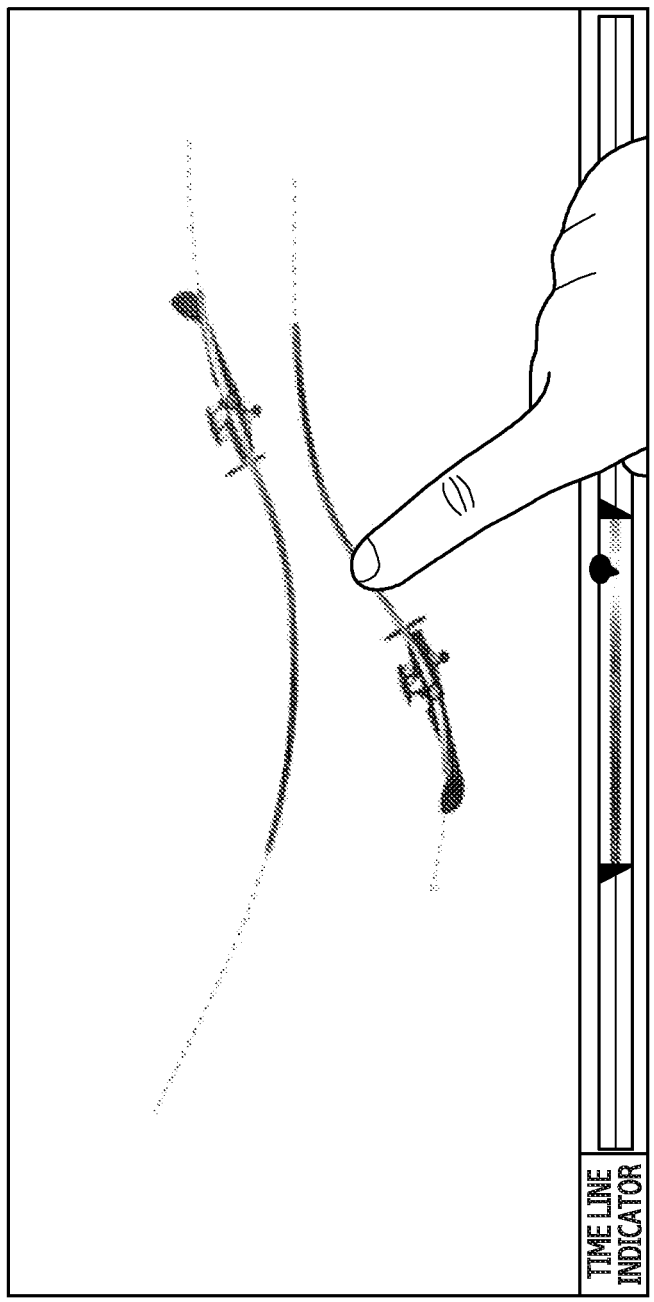
FIG. 9 illustrates a process of shifting time by dragging a color-spectrum on a motion path according to an embodiment of the present disclosure.

FIG. 9 illustrates a process of shifting time by dragging a color-spectrum on a motion path according to an embodiment of the present disclosure.

Referring to FIG. 9, the color spectrum length is readjusted to fill the edited length in real time. The animations of individual objects are synced by shifting time directly on the motion path. The current time marker on the timeline also moves along with the associated color to the new position.

Figure 10:
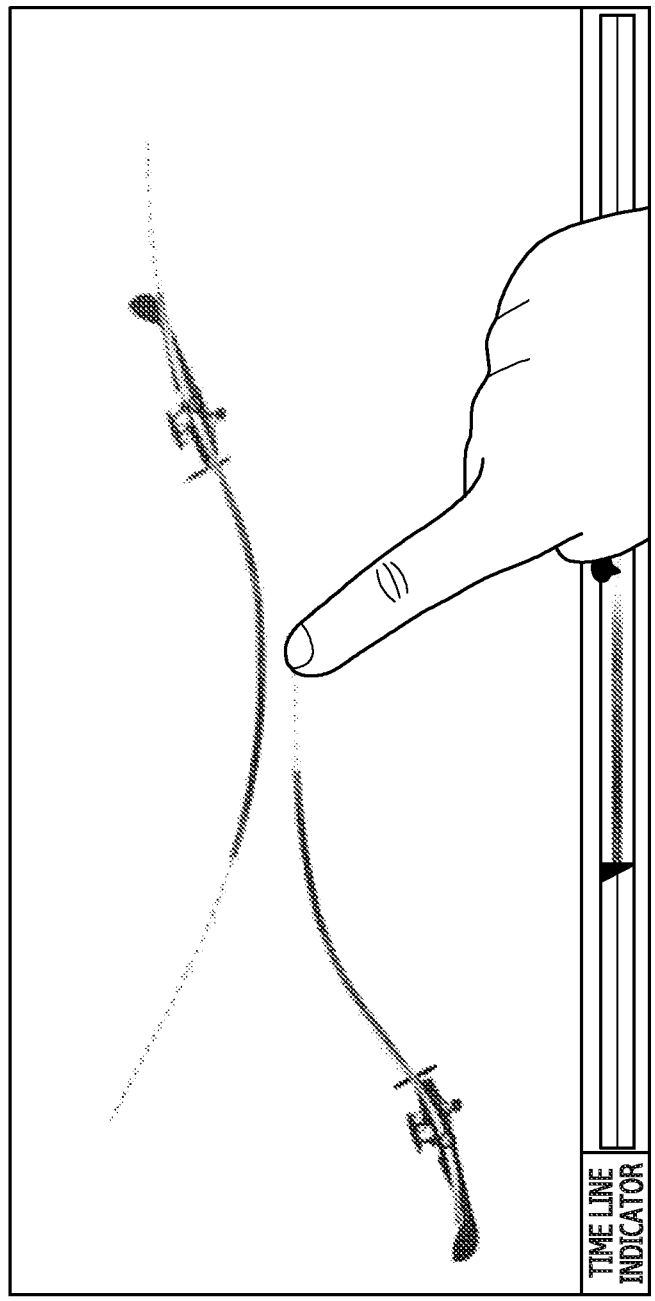
FIG. 10 illustrates a process of shifting an object position by dragging a motion path directly according to an embodiment of the present disclosure.

FIG. 10 illustrates a process of shifting an object position by dragging a motion path directly according to an embodiment of the present disclosure.

Referring to FIG. 10, the animations of individual objects are synchronized by changing their position directly in editing area, where the motion path is directly dragged to shift the object path. The color-spectrum and the current time marker will remain unchanged relative to the motion path.

Figure 11:
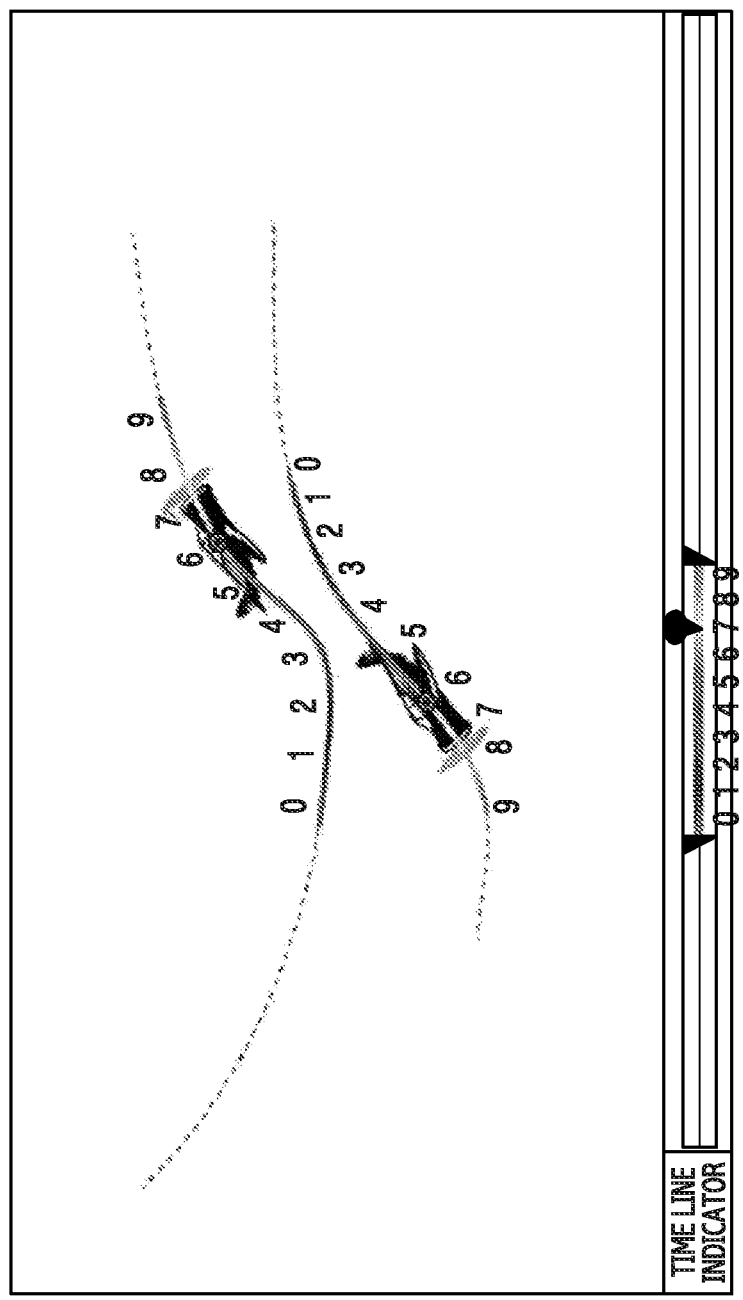
FIG. 11 illustrates a process of displaying visual information (alphanumeric) along with/instead of colors to represent time and position on a motion path according to an embodiment of the present disclosure.

FIG. 11 illustrates a process of displaying visual information (alphanumeric) along with/instead of colors to represent time and position on a motion path according to an embodiment of the present disclosure.

Referring to FIG. 11, methods other than mapping color spectrum can be used to represent extra information on timelines. For example numbering timeline and displaying the corresponding number information on the motion path.

Figure 12:
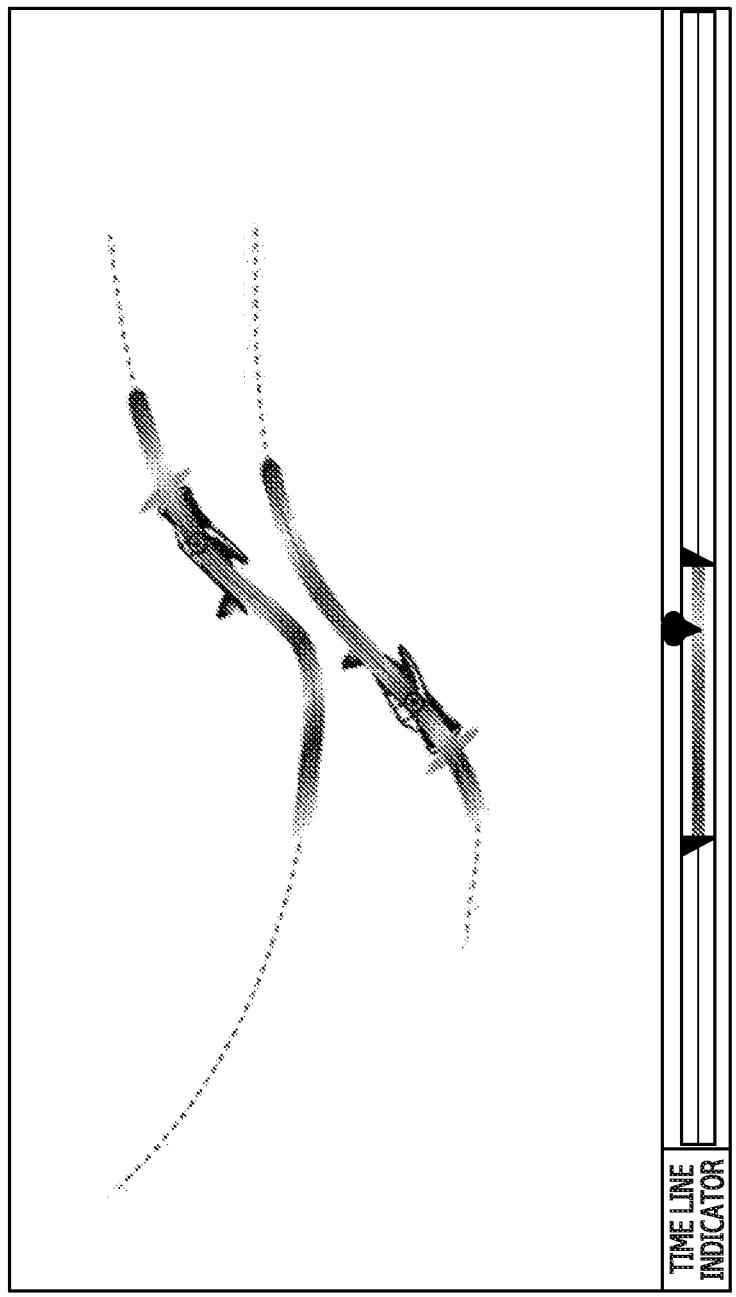
FIG. 12 illustrates a process of representing depth information of objects using a grayscale indicator on a motion path according to an embodiment of the present disclosure.

FIG. 12 illustrates a process of representing depth information of objects using a grayscale indicator on a motion path according to an embodiment of the present disclosure.

Referring to FIG. 12, the depth information of the objects is represented on the screen by adding an extra line with the gray scale indicator. The grayscale indicates that the darkest region represents the farthest position and lightest region represents the closest position of the object.

Figure 13:
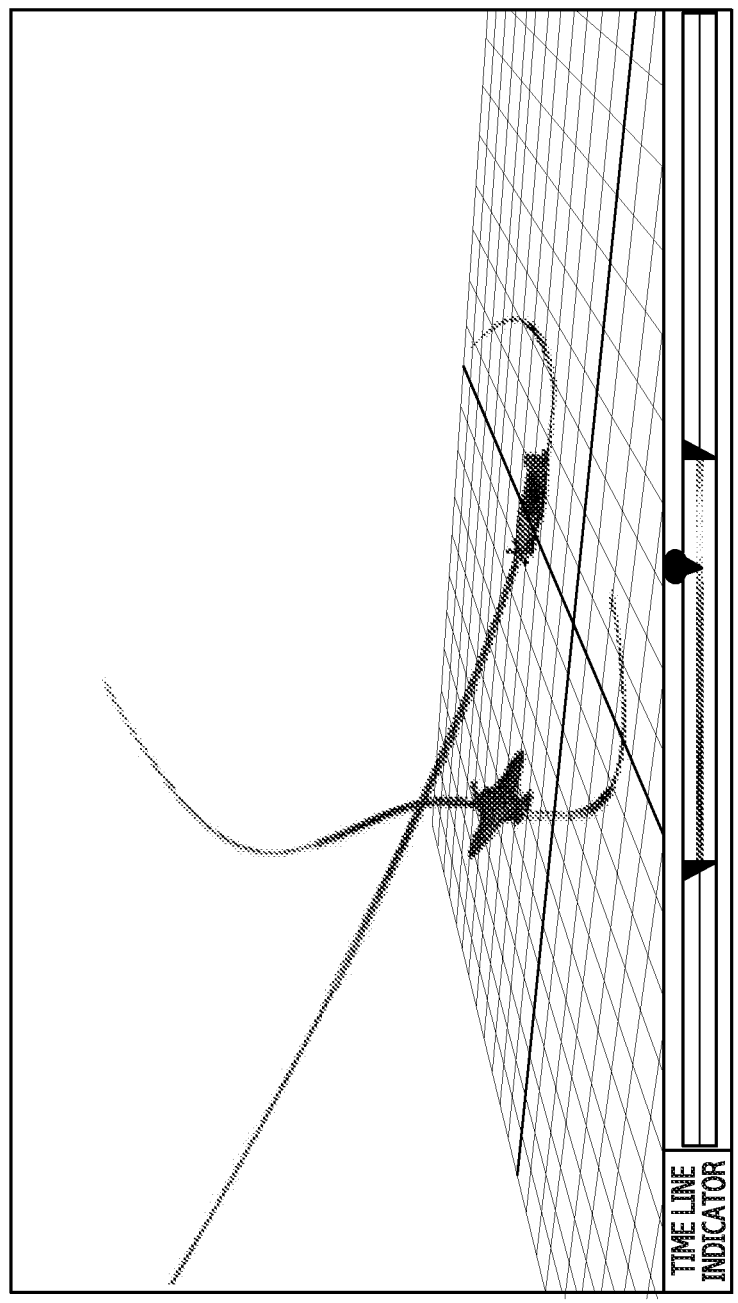
FIG. 13 illustrates a process of depicting time information by using color-spectrum on a three dimensional motion path according to an embodiment of the present disclosure.

FIG. 13 illustrates a process of depicting time information by using color-spectrum on a 3D motion path according to an embodiment of the present disclosure.

Referring to FIG. 13, according to an embodiment of the present disclosure, the color spectrum is displayed on a 3D motion path in the editing area.

FIG. 14 illustrates a color representation with gradients vs color bands according to an embodiment of the present disclosure.

Referring to FIG. 14, the selected time range is overlaid with a color spectrum which is either as color gradients (segmented) or as color bands (continuous).

Figure 15:
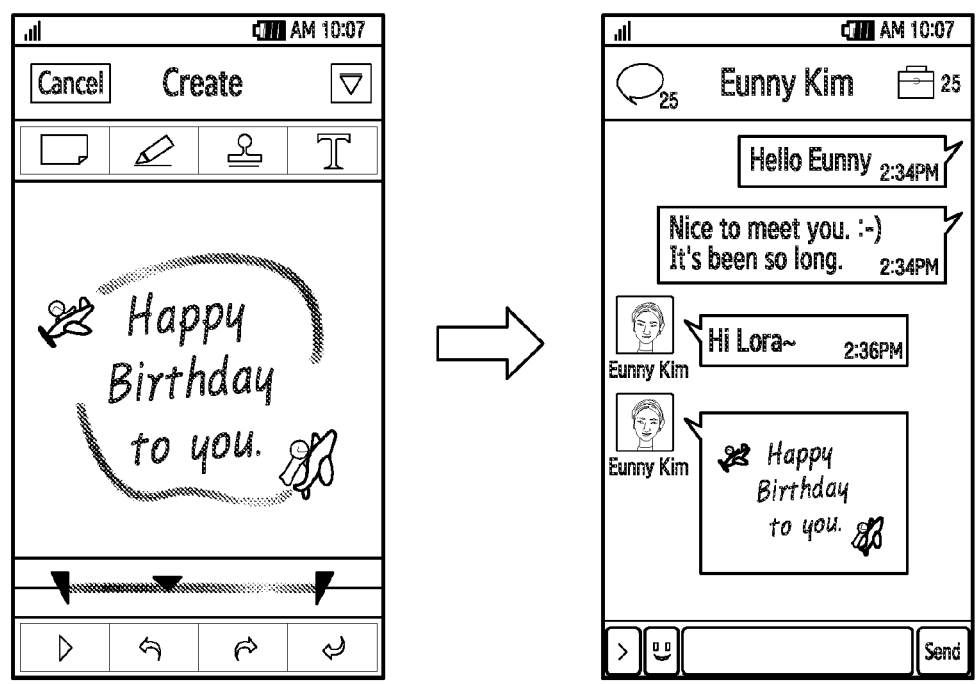
FIG. 15 is a snapshot illustrating a chat application which enables users to transmit and receive animated messages according to an embodiment of the present disclosure.

FIG. 15 is a snapshot illustrating a chat application which enables users to transmit and receive animated messages according to an embodiment of the present disclosure.

Referring to FIG. 15, the messaging platform enables users to transmit and receive animated messages which are created using the platform according to the disclosed disclosure. The clip-arts from an existing library of images are used to animate and convey a message visually.

Figure 16:
FIG. 16 is a snapshot illustrating a tracking application which marks a position of people on a map as per time according to an embodiment of the present disclosure.

FIG. 16 is a snapshot illustrating a tracking application which marks a position of people on a map as per time according to an embodiment of the present disclosure.

Referring to FIG. 16, the location tracking application marks the position of the people on the map as per time.

An embodiment of the present disclosure discloses an advanced method of displaying and editing timeline and related information of moving objects especially for animation content creation. The method maps the time information to colors or any visual indicators represented directly on the motion path. Accordingly, the user selects a part (or full) of the main timeline provided on the user interface. The selected portion is then assigned colors such that time "t0" to "tn" is represented by colors ranging from "Color-0" to "Color-n". These colors are then mapped on to the Motion-Path represented on the display.

Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device for generating a visual representation of object timelines in a multimedia user interface, the method comprising:
   displaying at least one object with a motion path, and a timeline through a display coupled with the electronic device; and
   displaying a part of the motion path of the at least one object, corresponding to a time span, with a first visual indicator,
   wherein the timeline includes a first marker indicating a start time of the time span, a second marker indicating an end time of the time span and a third marker, located between the first marker and the second marker, indicating a current time, and
   wherein the at least one object is displayed at a position on the motion path corresponding to the current time.

2. The method of claim 1, wherein the time span on the timeline is displayed with a second visual indicator corresponding to the first visual indicator.

3. The method of claim 2, wherein a visual property of the first visual indicator matches a visual property of the second visual indicator in relation with the time information.

4. The method of claim 1, wherein the displaying of the at least one object comprises:
   detecting a change of a position of the third marker on the timeline by a user input; and
   displaying the at least one object at a position on the motion path corresponding to the changed position of the third marker on the timeline.

5. The method of claim 1, wherein the displaying of the at least one object comprises:
   detecting a change of a position of the at least one object along the motion path by a user input; and
   displaying another object, based on the changed position of the at least one object, along a motion path of the other object, in an amount corresponding to time associated with the change of the position of the at least one object.

6. The method of claim 1, wherein the displaying of the part of the motion path of the at least one object comprises:
   detecting a change of a position of at least one of the first marker and the second marker by a user input; and
   displaying a portion of the motion of the at least one object corresponding to a changed time span with a visual indicator,
   wherein the changed time span is determined according to the changed position of the at least one of the first marker and the second marker.

7. The method of claim 1, wherein the first visual indicator comprises at least one of a color indicator, an alpha numeric indicator, or a gray scale indicator.

8. The method of claim 1, wherein the first visual indicator is displayed in relation with a tracking application with a map function.

9. An apparatus comprising:
   a processor;
   a display coupled with the processor; and a memory configured to store instructions when executed by the processor, wherein the processor is configured to:
- display at least one object with a motion path, and a timeline through the display, and
- display a part of the motion path of the at least one object, corresponding to a time span with a first visual indicator,
- wherein the timeline including a first marker indicating a star time of the time span, a second marker indicating an end time of the time span and a third marker, located between the first marker and the second marker, indicating a current time, and
- wherein the at least one object is displayed at a position on the motion path corresponding to the current time.

10. The apparatus of claim 9, wherein the time span on the timeline is displayed with a second visual indicator corresponding to the first visual indicator.

11. The apparatus of claim 10, wherein a visual property of the first visual indicator matches a visual property of the second visual indicator in relation with the time information.

12. The apparatus of claim 9, wherein the processor is further configured to:
- detect a change of a position of the third marker on the timeline by a user input, and
- display the at least one object at a position on the motion path corresponding to the changed position of the third marker on the timeline.

13. The apparatus of claim 9, wherein the processor is further configured to:
- detect a change of a position of the at least one object along the motion path by a user input, and
- display another object, based on the changed position of the at least one object, along a motion path of the other object, in an amount corresponding to time associated with the change of the position of the at least one object.

14. The apparatus of claim 9, wherein the processor is further configured to:
- detect a change of a position of at least one of the first marker and the second marker by a user input, and
- display a portion of the motion of the at least one object corresponding to a changed time span with a visual indicator,
- wherein the changed time span is determined according to the changed position of the at least one of the first marker and the second marker.

15. The apparatus of claim 9, wherein the first visual indicator comprises at least one of a color indicator using different colors in gradient or separate, an alpha numeric indicator, or a gray scale indicator.

16. The apparatus of claim 9, wherein the first visual indicator is displayed in relation with a tracking application with a map function.

17. The apparatus of claim 9, wherein the motion path represents motion in a three-dimensional space.

18. At least one non-transitory computer-readable storage medium for storing a computer program of instructions configured to be readable by at least one processor for instructing the at least one processor to execute a computer process for performing the method of claim 1.

19. The method of claim 1,
- wherein the visual indicator comprises a color spectrum indicator, and
- wherein a position of each color of the color spectrum indicator on the motion path corresponds to a position of a same color in the time span.

20. The apparatus of claim 9,
- wherein the visual indicator comprises a color spectrum indicator, and
- wherein a position of each color of the color spectrum indicator on the motion path corresponds to a position of a same color in the time span.

* * * * *